(12) United States Patent
Lee et al.

(10) Patent No.: US 6,888,664 B2
(45) Date of Patent: May 3, 2005

(54) WAVELENGTH CONVERTING APPARATUS USING OPTICAL SOURCE HAVING FIXED WAVELENGTH AND AN OPTICAL CROSS CONNECT SYSTEM ADAPTING THEREOF

(75) Inventors: Jaemyoung Lee, Seoul (KR); Byoung-whi Kim, Kyungki-do (KR)

(73) Assignee: Electronics and Telecommunications Research Institute (KR)

( * ) Notice: Subject to any disclaimer, the term of this patent is extended or adjusted under 35 U.S.C. 154(b) by 215 days.

(21) Appl. No.: 10/201,811

(22) Filed: Jul. 24, 2002

(65) Prior Publication Data

US 2003/0030887 A1 Feb. 13, 2003

(30) Foreign Application Priority Data

Aug. 10, 2001 (KR) .................................. 10-2001-48339

(51) Int. Cl.[7] .............................. G02F 2/02; G02B 6/35
(52) U.S. Cl. ........................................ 359/326; 385/17
(58) Field of Search ............................... 359/326–332; 385/16–17

(56) References Cited

U.S. PATENT DOCUMENTS

| | | | | |
|---|---|---|---|---|
| 5,724,167 A | * | 3/1998 | Sabella | 398/50 |
| 5,739,935 A | * | 4/1998 | Sabella | 398/50 |
| 5,754,320 A | | 5/1998 | Watanabe et al. | |
| 5,781,335 A | * | 7/1998 | Derr | 359/326 |
| 6,055,250 A | | 4/2000 | Doerr et al. | |
| 6,317,529 B1 | * | 11/2001 | Kashima | 385/16 |
| 6,333,799 B1 | * | 12/2001 | Bala et al. | 398/9 |
| 6,606,427 B1 | * | 8/2003 | Graves et al. | 385/17 |
| 2003/0002106 A1 | * | 1/2003 | Takahashi et al. | 359/128 |

FOREIGN PATENT DOCUMENTS

JP      2000-175228      6/2000

OTHER PUBLICATIONS

IEEE Communications Magazine, Dec. 1998 "Multifrequency Lasers and Applications in WDM Networks", M. Zirngibl, 3 pages (pp. 39–41).

* cited by examiner

Primary Examiner—John D. Lee
(74) Attorney, Agent, or Firm—Blakely Sokoloff Taylor & Zafman (57) ABSTRACT

The present invention provides a wavelength converting apparatus and optical cross connect system using the same. The wavelength converting apparatus includes a plurality of optical sources of fixed wavelengths, a switching means, and at least one wavelength converting means. The optical sources with fixed wavelengths provide probe beams with fixed wavelengths, the wavelength being different from each other. The switching means selects at least one beam of a wavelength corresponding to a wavelength conversion request of a transmission signal among a plurality of beams inputted from the fixed-wavelength light sources, and provides the selected beam as a probe beam. The wavelength converting means receives the transmission signal and the probe beam from the switching means, and converts a wavelength of the inputted transmission signal through cross gain modulation, cross phase modulation or optical-to-electrical-to-optical (O/E/O) conversion of the transmission signals and the probe beams.

17 Claims, 8 Drawing Sheets

PRIOR ART
FIG. 1

PRIOR ART

WAVELENGTH CONVERTING APPARATUS USING OPTICAL SOURCE HAVING FIXED WAVELENGTH AND AN OPTICAL CROSS CONNECT SYSTEM ADAPTING THEREOF

BACKGROUND OF THE INVENTION

1. Field of the Invention

The present invention relates generally to a wavelength converting apparatus and an optical cross connect system adapting thereof, and more particularly to a wavelength converting apparatus and an optical cross connect system adapting thereof, in which a probe beam used for wavelength conversion is generated by optical sources having fixed wavelengths, thus allowing its costs to be low and wavelength conversion to be facilitated.

2. Description of the Prior Art

As a high speed data exchange service or wideband image service has recently been commercialized, there is great demand for large transmission capacity for a communication network. In addition, large-scale transmission is required for the construction of a super high speed communication network that is pursued to improve national competitiveness. In order to cope with the above-described demands, many methods of increasing communication speed have been suggested up to now. These methods are generally classified into three types: Time Division Multiplexing (TDM) to increase the communication speed by increasing electric circuit speed, Optical Time Division Multiplexing (OTDM) by making short pulses optically and multiplexing the pulses, and Wavelength Division Multiplexing (WDM) by employing various wavelengths and transmitting them through an optical fiber.

In TDM communication technology, apparatuses of several Gbps speed have been already developed, but it is known that communication speed faster than several Gbps is very difficult to achieve. In OTDM technology, technology of extracting clocks from high-speed multiplexed pulses is very complicated, so putting the technology to practical use faces a lot of problems. In WDM transmission technology, communication employs many wavelengths over a wide range of wavelength, so nowadays this technology is studied most actively.

In comparison with conventional communication technology in which only one wavelength is carried and transmitted on an optical fiber core, the WDM transmission method maximally utilizes a wide wavelength range (that is, a transmissible range) in such a way that signals are carried on channels arranged at a uniform wavelength interval, the various channels are optically multiplexed and transmitted through an optical fiber, and the channels are separated from one another and separately used by wavelength difference at the receiving side of the optical fiber.

In the WDM transmission method, an operation of multiplexing optical signals of various wavelengths into an optical fiber is called "Multiplexing," while an operation of separating a plurality of optical signals from one optical fiber is called "Demultiplexing." In a current WDM transmission method, wavelengths of about 1310 nm and 1550 nm are mostly employed.

When a transmission network is set up using an optical transmission system to which the WDM transmission method is applied, adding and dropping of wavelengths should be performed at the nodes of the transmission network. The adding and dropping are generally carried out by an optical cross connect system.

Figure 1:
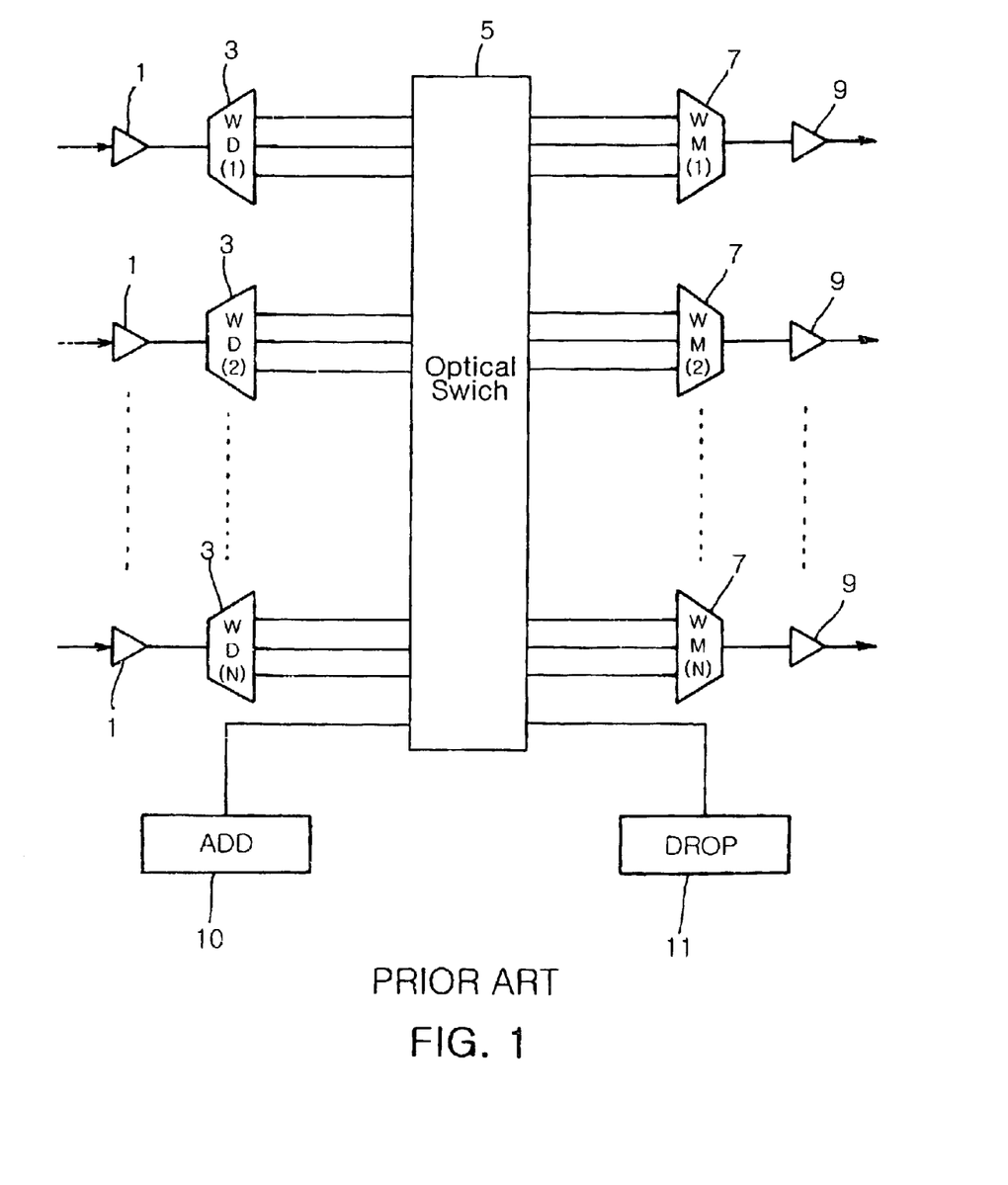
FIG. 1 is a diagram showing a structure of a general optical cross connect system.

FIG. 1 shows such an optical cross connect system. As shown in this drawing, the optical cross connect system employs an optical switch 5 between N demultiplexers 3 and multiplexers 7. A signal amplified by an optical preamplifier 1 is demultiplexed into respective signals by the demultiplexer 3, and the paths of the demultiplexed signals are selected by the optical switch 5. The signals from the optical switch 5 are multiplexed by the multiplexer 7, and the multiplexed signals are amplified by an optical amplifier 9 and connected to an output optical fiber.

In the WDM, a plurality of channels are arranged in a wide bandwidth and a plurality of signals are transmitted through the channels. Accordingly, in order to transmit signals, each signal having wavelength suitable for standard transmission, or to prevent interference between channels, the wavelengths of each channel must be precisely controlled. Furthermore, signals to be transmitted to any output link must be transmitted while each signal has a different wavelengths.

To this end, in the optical cross connect system, a wavelength converting apparatus is required to convert the wavelengths of signals from the demultiplexer 3 or the wavelengths of the signals into the multiplexer 7 to appropriate wavelengths. The wavelength conversion apparatus converts the signal wavelength to the wavelength of the probe beam through cross gain modulation, cross phase modulation, or optical-to-electrical-to-optical (OEO) conversion. The wavelength converting apparatus can be positioned after the demultiplexer 3 or in front of the multiplexer 7 of the optical cross connect system as shown in FIG. 1.

Figure 2:
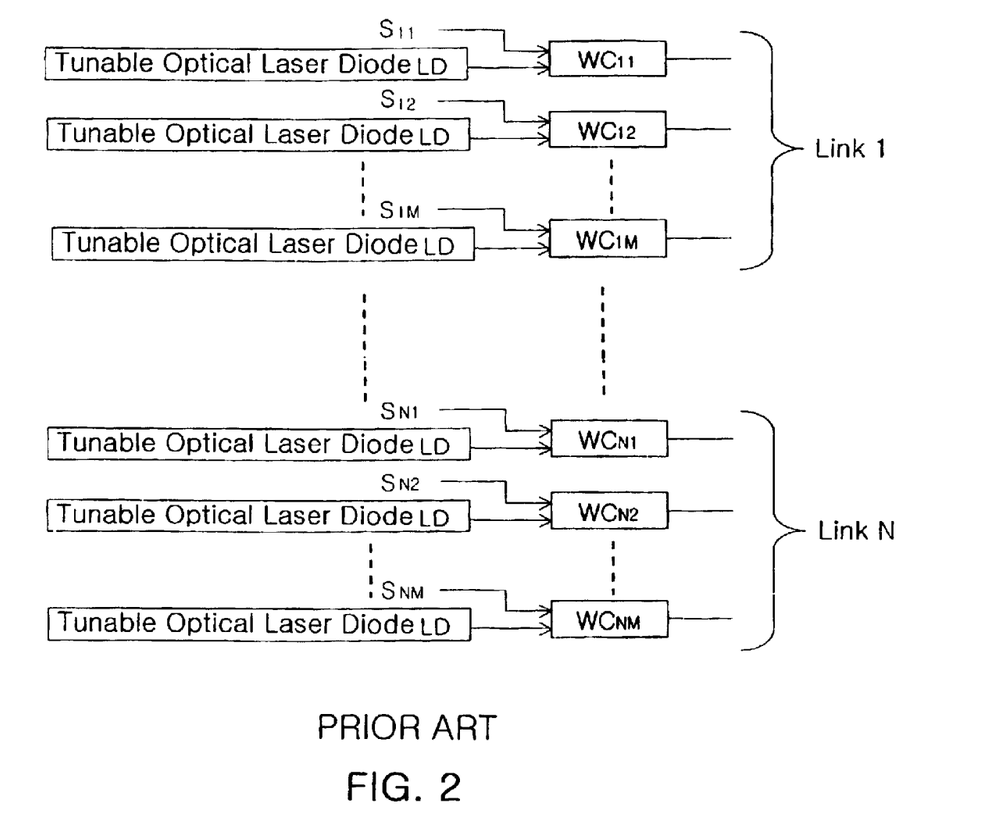
FIG. 2 is a diagram showing a structure of a conventional wavelength converting apparatus that is used in the optical cross connect system.

FIG. 2 shows a conventional wavelength converting apparatus that is used in conjunction with the conventional optical cross connect system. In this drawing, a conventional wavelength converting apparatus is shown, which is used for the conventional optical cross connect system having N links. As shown in this drawing, in the conventional wavelength converting apparatus, optical signals S propagate into M Wavelength Converters WCs provided in each link, and probe beams, each probe beam having a specific wavelength, also propagate from tunable optical sources at the same time. In FIG. 2, a laser diode is used as an example of such an optical source. Each of the optical signals S and each of the probe beams are injected to each of the WCs for cross gain modulation, cross phase modulation, or OEO conversion, so a signal having a desired wavelength can be produced from each of the WC according to the wavelength of the probe beam applied.

As described above, through the wavelength converting apparatus, the wavelength of the optical signal is converted according to the wavelength of the probe beam applied. In order to convert the signal wavelength, the tunable optical source changes its wavelength which is applied to the wavelength converter as a probe beam. Generally, the output wavelength of the tunable optical source is changed by controlling current and temperature. That is, to get a wavelength desired from the tunable source, it is required to compare the output wavelength with the intended wavelength and to adjust the current and the temperature.

In general, a probe beam produced from a tunable optical source is affected by surrounding temperature or current. Even though the wavelength of the probe beam from the tunable optical source is converted by a change of current or temperature, the converted wavelength may not be the wavelength desired because the change in temperature and current can make the converted wavelength drift away from the wavelength desired. Therefore, to keep the wavelength within a certain tolerable range of wavelength, regardless of temperature change in environment and undesired current change in the circuit, a locking apparatus is required.

This WC, however, requires a complicated control process. That is, to convert a wavelength, the WC disenables the locking function, converts the wavelength, and then locks the wavelength, enabling the locking function at the desired wavelength. This whole wavelength conversion process requires a complicated control algorithm, taking a relatively long time for the wavelength conversion.

In addition, as shown in FIG. 2, if the optical cross connect system consists of N links, each link having M channels, N×M tunable optical sources and wavelength locking controllers are required in order to convert wavelengths corresponding to each of the channels, requiring not only complicated control but high cost.

SUMMARY OF THE INVENTION

The present invention has been made keeping in mind the above problems occurring in the prior art, and an object of the present invention is to provide a wavelength converting apparatus, which uses fixed-wavelength light sources as probe beams for wavelength conversions in an optical cross connect system, making the wavelength conversion apparatus simple and cost-effective.

Another object of the present invention is to provide a fast wavelength converting apparatus by using fixed-wavelength light sources.

The other object of the present invention is to provide an optical cross connect system with a simple and cost-effective wavelength converting apparatus.

In order to accomplish the above objects, the present invention provides a wavelength converting apparatus, comprising: a plurality of fixed-wavelength light sources as probe beams to wavelength converters, the wavelength of each light source being different from each other; a switching means to select requested wavelengths and to provide the selected beams to appropriate wavelength converters as probe beams; and at least one wavelength converting means to convert signal wavelengths to appropriate wavelengths through cross gain modulation, cross phase modulation, or OEO conversion.

In addition, the present invention employs an optical switch and a wavelength converting apparatus in a optical cross connect system, which are connected to one or more demultiplexers and one or more multiplexers there between, and adding and dropping of beams are carried out at nodes of an optical transmission network by a wavelength division multiplexing method, wherein the wavelength converting apparatus comprises: M fixed-wavelength light sources, the wavelength of each light source being different from each other; M optical splitting means to divide each of the beams from optical sources into N beams, each optical splitting means being positioned at an output end of each of the M optical sources; a switching means to receive and switch the N×M beams from splitting means according to requests for wavelength conversion of transmission signals as probe beams; and N×M wavelength converting means to receive the probe beams from the switching means and the transmission signals, and converting wavelengths of the coming transmission signals to the wavelengths of probe beams through cross gain modulation, cross phase modulation, or OEO conversion.

In order to increase the power of the beams from the optical splitting means, M amplifying means may amplify the optical power of light sources at the output of the M light sources. Another method is amplifying the optical power after multiplexing wavelengths from the light sources, in which amplifying means is followed by a demultiplexer. The other method, to increase the optical power of the beams, is using a plurality of light sources with the same wavelength.

In the cross connecting system of the present invention, the wavelength converters may be positioned at the output of the demultiplexers or at the input of the wavelength division multiplexers.

The present invention provides an optical cross connect system, wherein the wavelength converters are positioned at the end of each of the wavelength division demultiplexers, comprising: N demultiplexers to demultiplex input signals into M signals; M fixed-wavelength light sources, the wavelength being different from each other; M optical splitting means to divide each of the fixed-wavelength light sources into N beams, each optical splitting means being positioned at the output end of each M light source; a first switching means to switch the split N×M output beams to appropriate wavelength converters according to the requests for wavelength conversions as probe beams; N×M wavelength converting means receiving the probe beams from the first switching means and the signals from a corresponding demultiplexer, to convert wavelengths of the input signals to appropriate wavelengths through cross gain modulation, cross phase modulation, or OEO conversion; at least one second switching means receiving the converted signals in wavelength, selecting paths of the signals, and adding and dropping the signals; and N multiplexers receiving M signals from the second switching means and multiplexing the M signals for each link.

The wavelength converters of the present invention may be positioned at the output end of the optical switch of the optical cross connect system, that is, between the optical switch and the wavelength division multiplexers. In this case, the wavelength converting apparatus may include or may not include the space switch.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

The present invention is for a wavelength converting apparatus with fixed-wavelength light sources, their wavelengths being different from each other. Since this invention uses fixed-wavelength light sources, a wavelength adjusting/controlling apparatus is not necessary to adjust the probe beam wavelength. Wavelength converter converts the input signal wavelength to wavelength of the probe beam by selecting the appropriate wavelength from the light sources through a switch.

An advantage that can be obtained by using the above fixed-wavelength optical source is that it does not require any wavelength control to switch from one wavelength to another. Since the cost of the fixed-wavelength light sources is generally lower than the tunable optical sources, it is possible to obtain the wavelength converting apparatus at a relatively low cost.

In general, a wavelength conversion method using the wavelength conversion apparatus may be classified into an optical method for converting wavelengths by a cross gain modulation or a cross phase modulation and an OEO conversion method. The wavelength converting apparatus of the present invention can be applied to both methods.

Optical cross connect system employing the wavelength converting apparatus of the present invention can be simple and cost-effective.

Hereinafter, a wavelength converting apparatus of the present invention is described in detail with reference to the accompanying drawings. In these drawings, the same elements will be described using the same reference numerals. Although in these drawings a laser diode LD is used as an example of a light source, the laser diode is only an example and the optical source is not limited to the laser diode.

Figure 3:
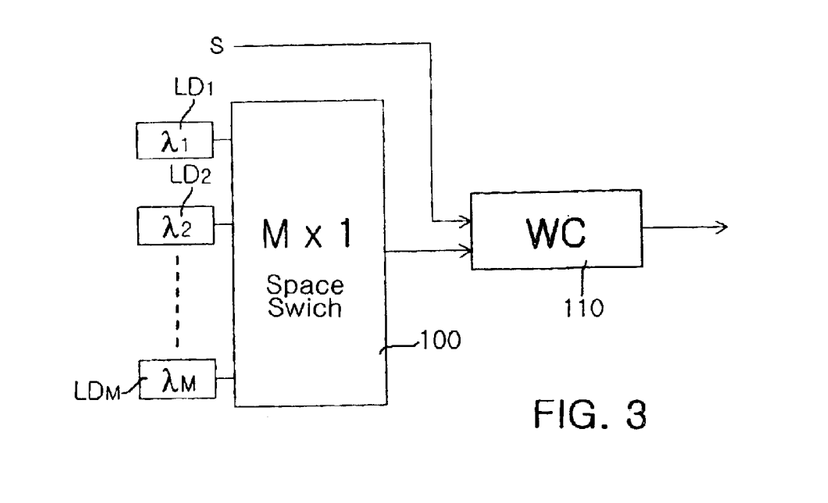
FIG. 3 is a diagram showing a basic concept of the wave converting apparatus in accordance with the present invention.

FIG. 3 is a diagram showing a basic concept of the wavelength converting apparatus in accordance with the present invention. The wavelength converting apparatus shown in this drawing is used to select a probe beam. A wavelength converting apparatus based on this structure may be applied to an optical cross connect system.

As shown in the drawing, probe beams with fixed wavelengths $\lambda 1, \lambda 2, \ldots$, and $\lambda M$ depending the wavelength of M optical sources LD1 to LDM are transmitted to a M×1 space switch 100. The M×1 space switch 100 selects a beam having a desired wavelength among the probe beams having wavelengths $\lambda 1, \lambda 2, \ldots$, and $\lambda M$ and outputs the selected beam to a wavelength converting apparatus 110. At the same time, the wavelength converting apparatus 110 converts the signal wavelength to the probe beam wavelength selected by the optical switch 100 of the optical cross connect system through cross gain modulation or cross phase modulation between the input signal and the probe beam.

The invented wavelength conversion system uses fixed wavelength sources. This system, therefore, is easily expanded to a larger system by employing more fixed-wavelength light sources in accordance with the required number of channels and wavelengths.

The space switch 100 selects a wavelength among the wavelengths of light sources by the control signal, and enable the wavelength to pass to the input port of wavelength converting apparatus 110 as a probe beam.

Figure 4:
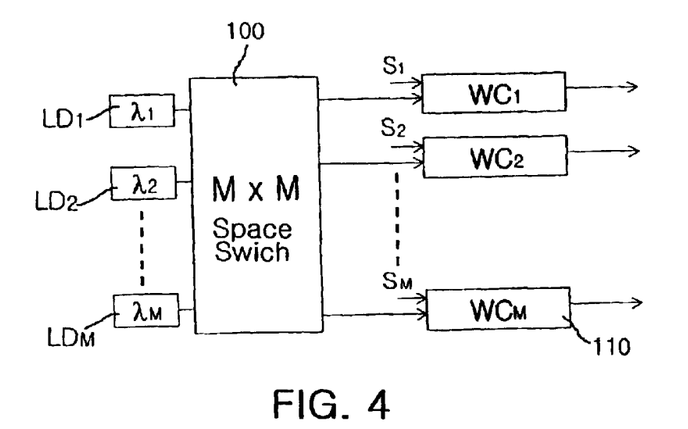
FIG. 4 is a diagram showing a wavelength converting apparatus of the present invention that outputs the M probe beams.

The wavelength converting apparatus having the above-described construction can be expanded and applied to an apparatus (which is applied to a system having N channels) as shown in FIG. 4. In this case, as shown in the drawing, the space switch 100 switches M beams from the light sources LD1 to LDM by using M×M switches to appropriate ports to provide wavelength converting apparatuses 110 with required wavelengths.

In general, the optical cross connect system is comprised of a plurality of links, each link having a plurality of channels. In order to apply the wavelength converting apparatus to the optical cross connect system, the wavelength converting apparatus should convert the wavelengths of N×M signals. So N×M probe beams are required.

Figure 5:
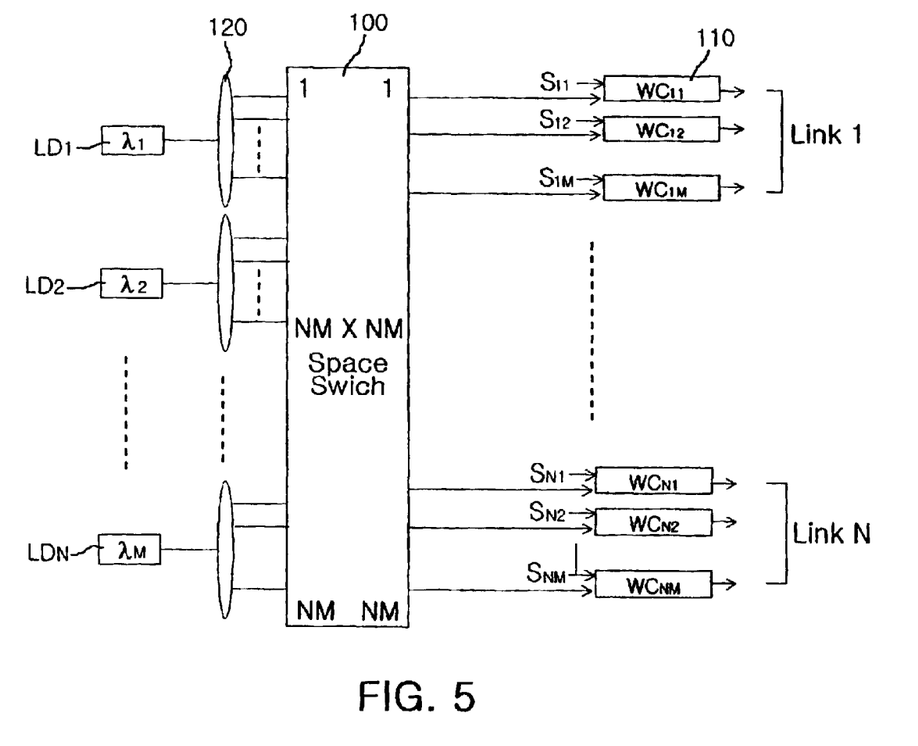
FIG. 5 is a diagram of a wavelength converting apparatus of the present invention, which is actually applied to the optical cross connect system.

FIG. 5 shows a wavelength converting apparatus that is actually applied to the optical cross connect system. As shown in this drawing, the wavelength converting apparatus is provided with optical sources LD1 to LDM corresponding to the wavelengths of the channels used. A NM×NM space switch 100, which switches NM beams corresponding to a total channel number of M×N, is employed as a space switch. Each of the beams from the optical sources LD1 to LDM is divided into N beams by a light splitter 120, the beams after the splitter are applied to and switched by the NM×NM space switch 100, and the switched beams are passed to wavelength converters WC11 to WCNM, along with optical signals S11 to SNM. To convert a signal wavelength through a wavelength converter, an appropriate wavelength was selected and provided through the NM×NM space switch 100.

As described above, the wavelength converting apparatus used in the optical cross connect system requires as many light sources as channels in which the output of each light source is divided into the number of links through a splitter 120. This structure, therefore, can reduce the cost of wavelength converting apparatus.

Since the optical output power, divided by N from its original optical power through 1-to-N splitter, may not have enough optical power, an optical amplifier may be needed.

However, if an optical cross system employs the small number of links, the proposed system can be used without any optical amplifiers as shown in FIG. 5.

To compensate for the reduced optical power after the splitter, we suggest two methods: one is amplifying the optical power of each light source using optical amplifier, and the other is using multiple sources for each wavelength.

Figure 6:
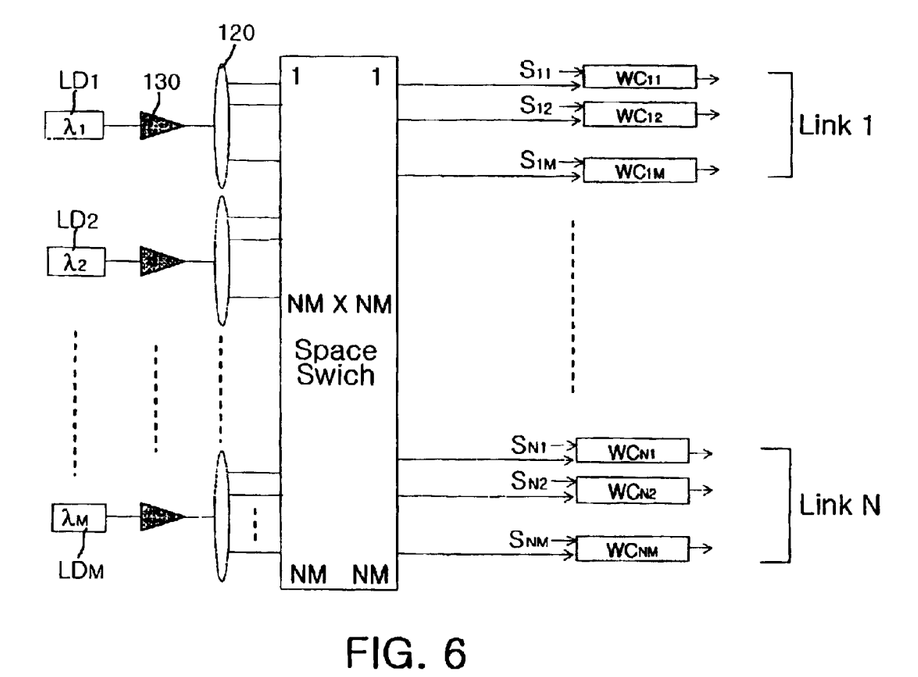
FIG. 6 is a diagram of a wavelength converting apparatus of the present invention, which converts wavelengths by amplifying beams outputted from optical sources of fixed wavelengths.

FIG. 6 shows a wavelength converting apparatus which uses M amplifiers 130 to increase the optical power of probe beams. In this method, M amplifiers were used to amplify the optical power of each light source, LD1 to LDM. The output from each amplifier is passed to the switch input port after 1-to-N splitter, and switched to an appropriate input port of a wavelength converting apparatus.

Figure 7:
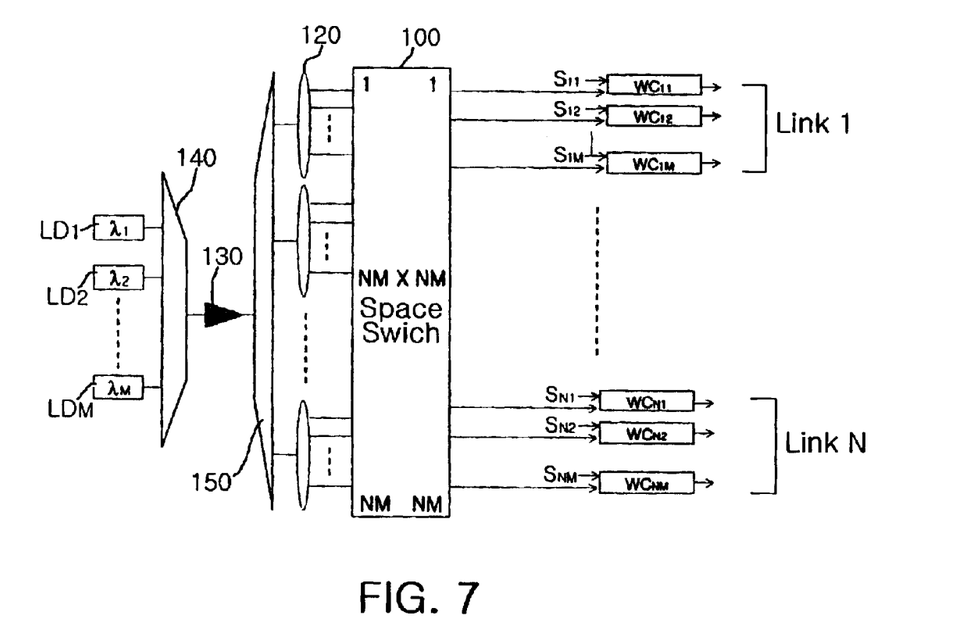
FIG. 7 is a diagram showing the wavelength converting apparatus that converts wavelengths by multiplexing and amplifying output beams of the optical sources with fixed wavelengths.

In the wavelength converting apparatus constructed as described above, to amplify the optical powers of M light sources, M amplifiers are required, which may increase the manufacturing cost of the suggested system. FIG. 7 shows a suggested system to reduce the cost of the system.

The wavelength converting apparatus as shown in the drawing includes a multiplexer and a demultiplexer, which are located at the output of optical sources. The beans from light sources, LD1 to LDM, are multiplexed by the multiplexer 140. The multiplexed beams are amplified by an amplifier 130. And then the amplified beams are demultiplexed into M beams by the demultiplexer 150. In this case, each of the demultiplexed beams has increased optical power by a degree corresponding to the amplification factor of the amplifier 130 as compared with the optical power at the output of the light source. The optically amplified beams propagate to the optical splitters 120 and split into N beams. The split beams are passed to a NM×NM space switch 100.

As described above, the wavelength converting apparatus having a structure shown in FIG. 7 requires only one amplifier 130 to amplify the optical power of the optical sources LD1 to LDM, so it can be manufactured at a low cost in comparison with the wavelength converting apparatus shown in FIG. 6.

Figure 8:
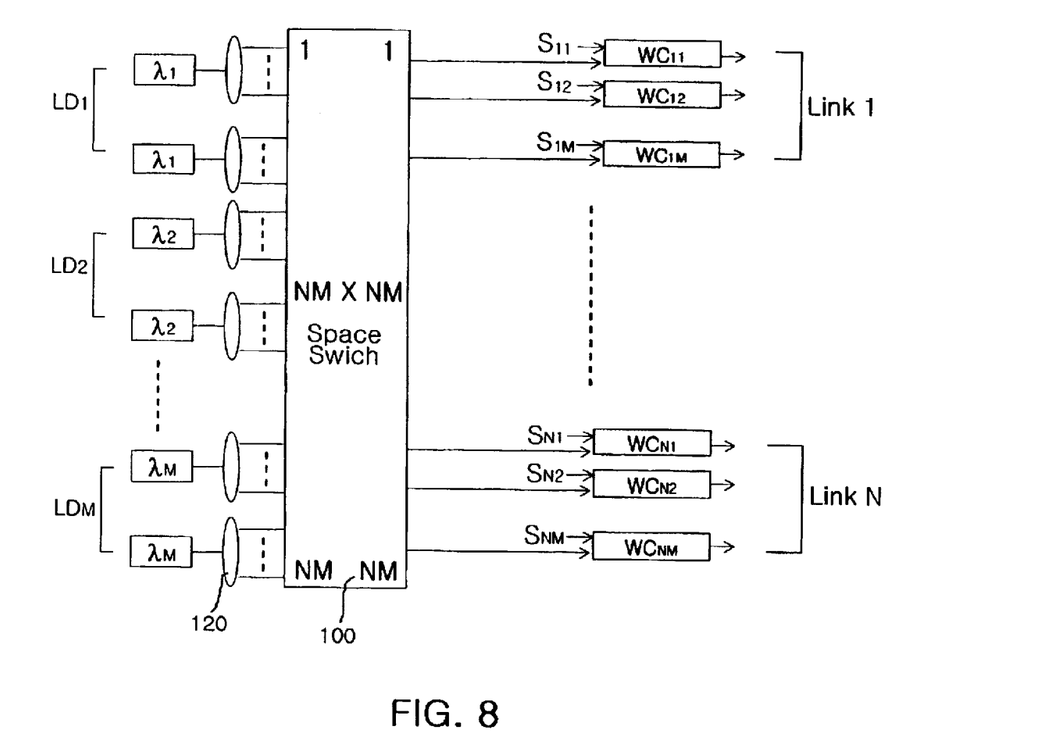
FIG. 8 is a diagram showing the wavelength converting apparatus with a plurality of optical sources having the same fixed wavelengths.

FIG. 8 shows a wavelength converting apparatus of the present invention consisting of multiple sources with the same wavelengths for each wavelength. In this apparatus, the number of light sources with the same wavelength can be set arbitrarily. Optical splitters 120 divide optical power of the light sources at the output of the light sources. The splitting ratio can be set arbitrarily which is different from the case of FIG. 5.

Each optical splitter of FIG. 5 is connected to only one fixed-wavelength light source, so output of each light source should be divided into N beams, the number of links in the optical cross system. On the other hand, if multiple fixed-wavelength light sources with the same wavelength are used, the splitting capacity of the splitter does not have to be as large as the previous case. For example, when two optical sources with the same wavelength are provided, splitting capacity of each splitter can be set to N/2. On the other hand, when three optical sources with the same fixed wavelength are used, the splitting capacity of each optical splitter is set to N/3.

As described above, the wavelength converting apparatus of the present invention converts the wavelengths of signals by utilizing beams from fixed-wavelength light sources as probe beams. In this invention, conventional expensive tunable light sources are not required, and a locking control process to stabilize the wavelengths from tunable light sources after wavelength conversion is not required. Therefore, the simple wavelength converting apparatus can be cost-effectively manufactured.

Figure 9A:
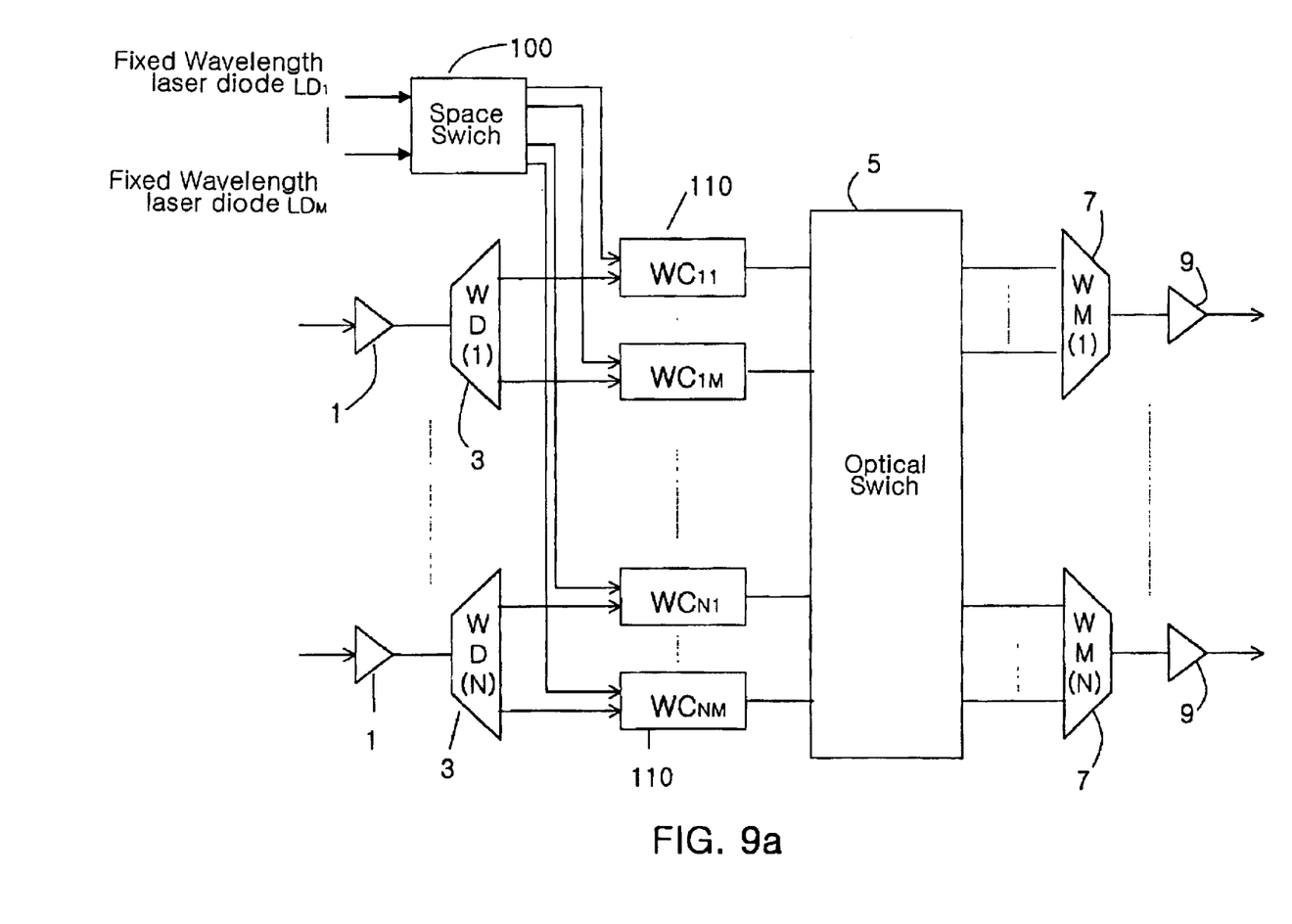
FIGS. 9a, 9b and 9c are diagrams showing cross connecting systems to which the wavelength converting apparatuses of the present invention are applied.
Figure 9B:
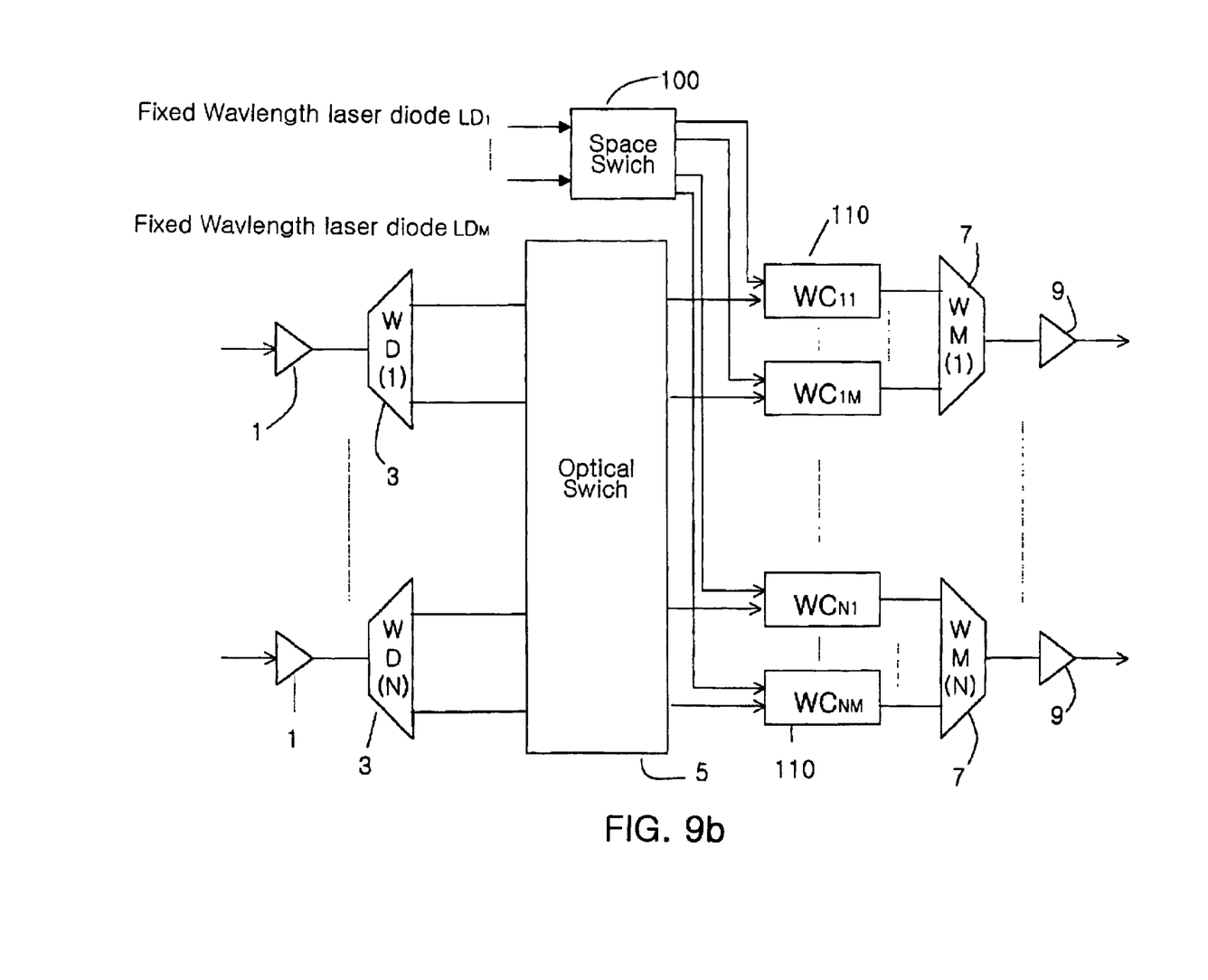
Figure 9C:
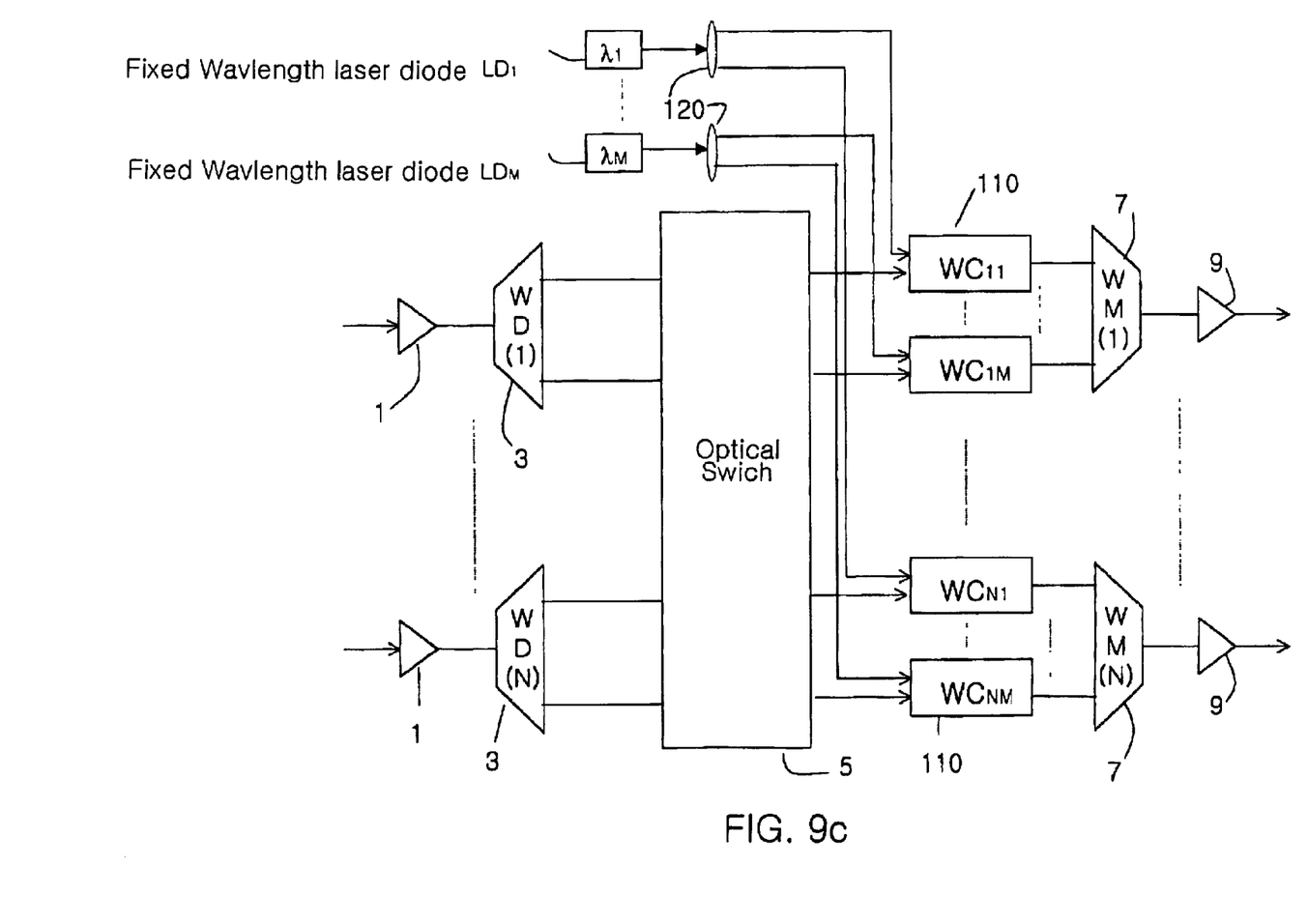

FIGS. 9a, 9b and 9c are diagrams showing cross connecting systems to which the wavelength converting apparatuses of the present invention are applied.

FIG. 9a shows an optical cross connect system in which an optical switch 5 is positioned between N demultiplexers 3 and N multiplexers 7 and the wavelength converters WC11 to CNM are positioned at the output of the demultiplexers 3, that is, between the demultiplexers 7 and the optical switch 5. Optical signals from the demultiplexers 3 are applied to wavelength converting apparatuses. Probe beams provided by fixed-wavelength light sources are switched by the space switch 100 are applied to the wavelength converters WC11 to WCNN. The wavelengths of the optical signals are converted through the cross gain modulation, the cross phase modulation, or the OEO conversion through the wavelength converters WO11 to WCNM.

Optical signals from the wavelength converters WC11 to WCNM can be dropped by the optical switch 5, or propagated to the multiplexers 7.

Although in this drawing just only wavelength converters are included in the optical cross connect system and optical sources of fixed wavelengths or a space switch (or optical splitters, multiplexers, or demultiplexers) are separately provided outside of the optical cross connect system, such a construction is described for convenience of explanation. In an actual optical cross connect system, all elements shown in the drawing can be packaged in a single system.

An optical cross connect system shown in FIG. 9b has a similar structure to that of the optical cross connect system shown in FIG. 9a. The two cross connecting systems are different from each other in terms of the position of the wavelength converting apparatus. That is, the wavelength converting apparatus of FIG. 9b is positioned between the optical switch 5 and the multiplexers 7 and converts the wavelengths of signals from the optical switch 5. The optical cross connect system shown in FIG. 9b has the same function and effect as that of FIG. 9a, so a detailed description of the system is omitted.

In addition, although not shown in the drawing, the space switch of the wavelength converting apparatus may be removed if the wavelength converting apparatus is positioned between the optical switch of the optical cross connect system and the multiplexers. Such a construction is shown in FIG. 9c, in which only the space switch is removed from the construction of FIG. 9b. As described above, the reason for removing the space switch from the wavelength converting apparatus is as follows. In general, the wavelength converting apparatus is used to enable each signal in a link to propagate with different wavelength from each other, minimizing any interference between signals. In FIG. 9c, the wavelength of each signal applied to wavelength converting apparatus is converted to a pre-determined wavelength by the wavelength converting apparatus having its own fixed-wavelength probe beam, in which the switch to select a probe beam is not required. In brief, in the optical cross connect system such as of FIGS. 9b and 9c, the wavelength converting apparatus may or may not include the space switch.

In the optical cross connect system constructed as described above, signals inputted to the optical switch 5 after being demultiplexed by the demultiplexers propagate to output ports of the cross connect system through the optical switch. While switching their paths in the optical switch 5, the signals momentarily cannot propagate through the switch. That is, a momentary signal delay occurs by the switching operation of the optical switch 5.

In the present invention, switching speed of the space switch of the wavelength converting apparatus is set to be slightly slower than or identical with the switching speed of the optical switch, and the space switch is operated during the signal delay of the switching operation of the optical switch, thereby preventing a delay caused by the operation of the space switch.

Although the tunable wavelength optical source having a tunable speed faster than the switching speed of the optical switch of the present invention may be used if the tunable wavelength optical sources are employed as the wavelength converting apparatus in the optical cross connect system. However, the overall operation of the optical cross connect system depends on the operation time of the optical switch because signals cannot propagate during switching paths. In this case, there is no advantage in using the wavelength converting apparatus faster than the space switch. On the other hand, in the optical cross connect system of the present invention, the space switch of the wavelength converting apparatus operates while switching paths in the optical switch, so the time delay caused by the wavelength conversion can be prevented. As a result, in the optical cross connect system equipped with the wavelength converting apparatus of the present invention, the speeds of path selection, beam splitting and beam drop can be improved in comparison with an optical cross connect system equipped with a conventional wavelength converting apparatus.

The number of fixed-wavelength light sources, the space switch and the wavelength converting apparatus used in the present invention are not necessarily limited according to a system to which they are applied. In addition, although the wavelength converting apparatus of the present invention was described as being applied to the optical cross connect system, it can be applied to any system for converting the wavelength of the optical signal.

As described above, beams from the fixed-wavelength light sources are used as probe beams to convert the wavelengths of the signals of the optical cross connect system of the present invention, so the manufacturing cost of the optical cross connect system can be reduced in comparison with a conventional wavelength converting apparatus using expensive tunable optical sources. In addition, the present invention does not require locking control for wavelength conversion necessary for the tunable optical sources after wavelength conversion, so the manufacturing cost can be further decreased.

In general, the wavelength conversion is performed by changing current and temperature in tunable optical sources employed in the conventional wavelength converting apparatus, so a time delay for locking the wavelength after wavelength conversion cannot be avoided for the conventional optical cross connect system. On the other hand, the present invention does not need any wavelength locking control after wavelength conversion, because the invention employs fixed-wavelength light sources. Therefore, it could be possible to carry wavelength conversions faster than the conventional system using tunable sources. The present invention of a wavelength converting apparatus in the optical cross connect system can be manufactured to have a simple structure at a low manufacturing cost, reducing the whole cost of the optical cross connect system.

What is claimed is:

1. A wavelength converting apparatus, comprising:
   a plurality of fixed-wavelength light sources for outputting beams having fixed wavelengths, the wavelength being different from each other;
   a switching means for selecting at least one wavelength corresponding to a wavelength conversion request for a transmission signal among the plurality of beams from the fixed-wavelength light sources, and providing the selected beam as a probe beam; and
   at least one wavelength converting means for receiving the probe beam from the switching means and the transmission signal, and converting a wavelength of the transmission signal to the probe beam wavelength through cross gain modulation, cross phase modulation, or OEO conversion.

2. The wavelength converting apparatus according to claim 1, further comprising an optical splitting means positioned at output ports of the light sources for splitting output beams outputted from each light source into a plurality of beams with the same wavelengths.

3. The wavelength converting apparatus according to claim 2, further comprising a plurality of amplifying means for amplifying a corresponding beam outputted from the optical source, each amplifying means being positioned at an output end of each light sources.

4. The wavelength converting apparatus according to claim 2, further comprising:
   a multiplexer positioned at output ports of the light sources for multiplexing output beams of the light sources, the beams having different wavelengths from each other; an amplifying means for amplifying the multiplexed beams; and
   a demultiplexer for demultiplexing the amplified beam.

5. The wavelength converting apparatus according to claim 2, wherein the optical sources are comprised of multiple light sources with the same wavelength.

6. The wavelength converting apparatus according to claim 1, further comprising a plurality of amplifying means for amplifying a corresponding beam outputted from the optical source, each amplifying means being positioned at an output end of each light sources.

7. The wavelength converting apparatus according to claim 1, further comprising:
   a multiplexer positioned at output ports of the light sources for multiplexing output beams of the light sources, the beams having different wavelengths from each other; an amplifying means for amplifying the multiplexed beams; and
   a demultiplexer for demultiplexing the amplified beam.

8. The wavelength converting apparatus according to claim 1, wherein the switching means is a space switch.

9. An optical cross connect system, in which an optical switch and a wavelength converting apparatus are connected to one or more wavelength division demultiplexers and one or more wavelength division multiplexers, and adding/dropping of beams are carried out at nodes of an optical transmission network by using a wavelength division multiplexing method, wherein the wavelength converting apparatus comprises:
   M light sources with fixed wavelengths for providing beams with fixed wavelengths, the wavelength being different from each other;
   M optical splitting means for splitting each of the beams outputted from the M light sources into N beams, each optical splitting mean being positioned at an output end of each of the M light sources;
   a switching means for receiving and switching the split N×M beams according to a request for wavelength conversion of a transmission signal, and outputting the switched beams as probe beams; and
   N×M wavelength converting means for receiving the probe beams from the switching means and the transmission signal, and converting a wavelength of the inputted transmission signal through cross gain modulation, cross phase modulation, or OEC conversion.

10. The optical cross connect system according to claim 9, further comprising M amplifying means for amplifying beams outputted from the M light sources, each amplifying means being positioned at an output of each of the M light sources.

11. The optical cross connect system according to claim 10, further comprising:
   a multiplexer positioned at the output of the M light sources for multiplexing output beams having wavelengths outputted from the M light sources, the wavelengths being different from each other;
   an amplifying means for amplifying the multiplexed beam; and
   a demultiplexer for demultiplexing the amplified beam into N×M beams.

12. The optical cross connect system according to claim 9, further comprising:
- a multiplexer positioned at the output of the M light sources for multiplexing output beams having wavelengths outputted from the M light sources, the wavelengths being different from each other;
- an amplifying means for amplifying the multiplexed beam; and
- a demultiplexer for demultiplexing the amplified beam into N×M beams.

13. The optical cross connect system according to claim 9, wherein the M light sources are comprised of a plurality of light sources with the same wavelengths.

14. An optical cross connect system, comprising:
- N wavelength division demultiplexers, each wavelength division demultiplexer for demultiplexing an input signal into M signals;
- N fixed-wavelengths light sources for outputting beams having fixed wavelengths, the wavelength being different from each other;
- N optical splitting means for splitting each of the beams outputted from each of the light sources into N beams, each optical splitting mean being positioned at an output end of each of the N light sources;
- a first switching means for switching the split N×N output beams according to a request for wavelength conversion of a corresponding signals and providing the switched beams as probe beams;
- N×N wavelength converting means for receiving the probe beams from the first switching means and the signals from a corresponding demultiplexer, converting a wavelength of the inputted signal through cross gain modulation, cross phase modulation, or OEO conversion, and providing the converted signals with new wavelengths;
- at least one second switching means for receiving the signals with converted wavelengths, selecting paths of the inputted signals, and adding and dropping the signals; and
- N multiplexers for receiving M signals outputted from the second switching means and multiplexing the M signals for a fiber.

15. The optical cross connect system according to claim 14, wherein the second switching means are N in number.

16. An optical cross connect system, comprising:
- N wavelength division demultiplexers, each wavelength division demultiplexer for demultiplexing an input signal into N signals;
- at least one first switching means for receiving the N×N demultiplexed signals, selecting paths of the inputted signals, and adding and dropping the signals;
- N optical sources of fixed wavelengths for outputting beams with fixed wavelengths, the wavelength being different from each other;
- N optical splitting means for splitting each of the beams outputted from optical sources into N probe beams, each optical splitting mean being positioned at the output of each of the N optical sources;
- N×N wavelength converting means for receiving the split probe beams and the signals from the first switching means, converting wavelengths of the signals through cross gain modulation, cross phase modulation, or OEO conversion; and N multiplexers for receiving the N signals outputted from the wavelength converting means and multiplexing the N signals for a link respectively.

17. The optical cross connect system according to claim 16, further comprising a second switching means for switching N×N probe beams inputted from the optical splitting means according to a request for wavelength conversion of the signals, and outputting the switched beams.

* * * * *